United States Patent
Manbert et al.

(12)
(10) Patent No.: US 6,182,161 B1
(45) Date of Patent: Jan. 30, 2001

(54) METHOD AND APPARATUS FOR BUILDING SOFTWARE NETS USING AN ARRAY STRUCTURE

(75) Inventors: Rush C. Manbert, San Jose; David D. Perry, Santa Cruz, both of CA (US)

(73) Assignee: MTI Technology Corp., Anaheim, CA (US)

( * ) Notice: Under 35 U.S.C. 154(b), the term of this patent shall be extended for 0 days.

(21) Appl. No.: 09/374,640

(22) Filed: Aug. 16, 1999

(51) Int. Cl.[7] .................................. G06F 3/00; G06F 13/14
(52) U.S. Cl. .......................... 710/5; 711/100; 711/114; 709/7; 709/8; 709/9
(58) Field of Search .................................. 710/5; 709/7, 8, 709/9; 711/100, 114

(56) References Cited

U.S. PATENT DOCUMENTS

| 5,745,778 | * | 4/1998 | Alfieri ........................... 395/800.01 |
| 5,860,003 | * | 1/1999 | Eidler et al. ..................... 395/676 |
| 5,950,006 | * | 9/1999 | Crater et al. ..................... 395/705 |
| 6,105,053 | * | 8/2000 | Kimmel et al. .................... 709/105 |

* cited by examiner

Primary Examiner—Thomas C. Lee
Assistant Examiner—Rehana Perveen
(74) Attorney, Agent, or Firm—Townsend and Townsend and Crew LLP

(57) ABSTRACT

An improved method and apparatus for providing I/O operations. In particular, a particular I/O operation is programmed as a net in a matrix format. Upon initialization of the I/O subsystem, an intermediate representation of the net in matrix format is created. Subsequently, upon a running of the net operation, a complete version of the net matrix is created.

10 Claims, 4 Drawing Sheets

| B0 | B1 | B2 | B3 | |
|---|---|---|---|---|
| GHD | RDD | ROP | -- | ←100 |
| IN | IN | IN | XOR | ←102 |
| WND | -- | -- | WNP | ←103 |

METHOD AND APPARATUS FOR BUILDING SOFTWARE NETS USING AN ARRAY STRUCTURE

BACKGROUND OF THE INVENTION

The present invention relates to input/output (I/O) subsystems, in particular memory subsystems such as a Redundant Array of Independent Disks (RAID) subsystem. In particular, the invention relates to methods for building software to handle various memory operations.

U.S. Pat. No. 5,860,003, incorporated herein by reference, shows a modular software control system for an I/O subsystem. A central group of software modules are made to be hardware-independent, with interface modules translating to and from the host hardware configuration and the I/O subsystem hardware configuration. I/O commands are executed using a series of specialized threads, with each thread performing a particular function. An appropriate group of threads are assembled for each I/O command, the group being a "net".

High performance and bandwidth is accomplished by having the threads independent and able to operate concurrently. In a RAID system, for example, if each net operates on a particular span of data in the disk drives, other nets can operate on other spans in the same disk drives concurrently. Even for a particular span of data, only particular threads within a net that actually use the disk drives need to lock up that span for the duration of the thread operation.

The span lock capability improves throughput over prior art systems where an entire physical disk drive needs to be locked to a particular I/O command. In addition, within a span, an error recovery routine may be run and only need to lock up a particular portion of that span. Thus, the thread discovering the error, or other threads, could use other portions of the span concurrently with the error recovery, further improving the bandwidth.

A core command engine is provided which is generic and can be used with any I/O system hardware. This is accomplished using a generic command module which communicates with a media module to obtain a particular net for an I/O command. The media module knows the configuration, such as RAID 3 or RAID 5, of the I/O subsystem. The command module need not know this information, and is generic. Even the media module does not know the particular hardware used, which is in turn dealt with by separate hardware interface modules.

As users are provided more flexibility in configuration, the number of nets expands dramatically. Different program nets are required to handle I/O operations with varying parameters, such as different RAID levels, different numbers of disk drives in the array, etc. Such a proliferation of options dramatically increases the programming complexity.

SUMMARY OF THE INVENTION

The present invention provides an improved method and apparatus for providing I/O operations. In particular, a particular I/O operation is programmed as a net in a matrix format. Upon initialization of the I/O subsystem, an intermediate representation of the net in matrix format is created. Subsequently, upon a running of the net operation, a complete version of the net data structure is created.

The present invention in one embodiment essentially provides a compiler that generates an intermediate representation of a net, and an interpreter that reads that representation when it is time to build a net. The interpreter does all the final mapping. The separation into two blocks for creation of a net allows optimization of the execution speed of the interpreter part, while not being burdened with optimizing the compiler part. This modularization and the use of a matrix configuration simplifies the programming of a net for an I/O operation, and automates the generation of the final, complete net.

Typically, while the matrix format in which the net was programmed is designed with a particular RAID level in mind, the intermediate matrix representation of the net will not require any knowledge of RAID level, and the interpreter portion of the net builder software will not make any decisions based on the RAID level. The intermediate representation will include all parameters necessary to construct the desired net geometry for all the allowable array widths. The final, complete net structure will be built to accommodate the actual array width, with the proper number of independent disk access threads and the appropriate number and mapping of data buffers.

The present invention provides an array or matrix representation of threads used in a net. The columns of the matrix define common thread buffer usage, while the rows of a matrix define parallel thread execution.

For a further understanding of the nature and advantages of the invention, reference should be made to the following description taken in conjunction with the accompanying drawings.

DESCRIPTION OF THE SPECIFIC EMBODIMENTS

Figure 1:
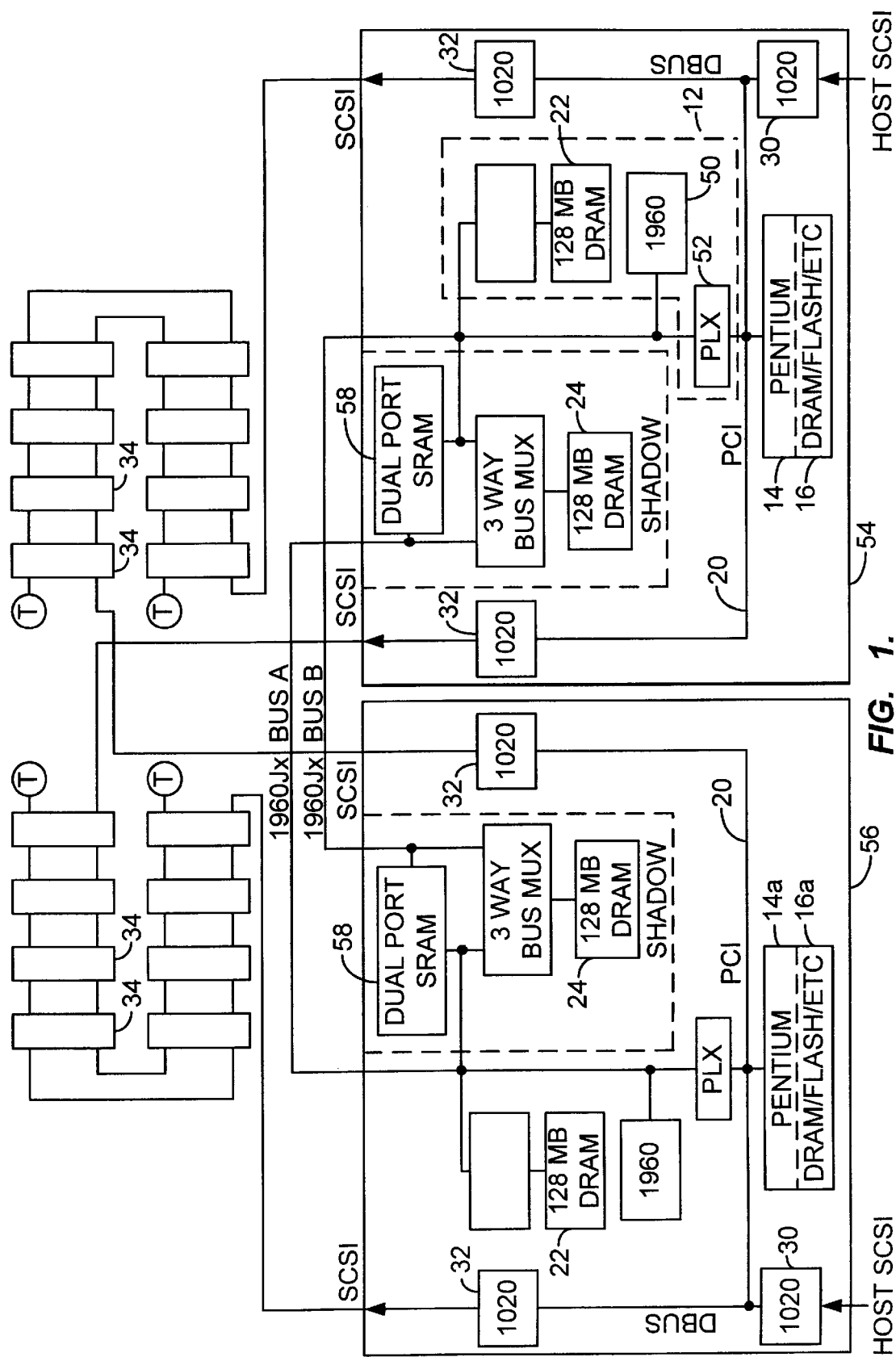
FIG. 1 is a block diagram of one embodiment of a RAID controller hardware for use with the present invention.

FIG. 1 is a block diagram of a particular hardware platform which could be used in one embodiment of the present invention for RAID system. As can be seen, data flow is provided through two different host SCSI interfaces 30 to the disk drives 34. Each host SCSI interface 30 communicates with two RAID SCSI interfaces 32 over PCI busses 20. Data is staged in-between them in a buffer memory 22. Shadow buffer memories 24 are provided for redundancy.

Different entities perform the actual I/O functions in response to Opcodes from the threads. For example, RAID engine controller 50 is used for generating RAID parity (XOR) and other functions (e.g., comparing two buffers). The SPM performs the Opcodes for a read thread. The threads, along with the nets, are generated in microprocessor 14 using associated memory and support hardware 16. The media module and generic command module also run out of microprocessor 14, along with the host and drive personality modules. The threads actually execute in microprocessor 14, with their particular Opcodes being transmitted across PCI bus 20 through PLX interface 52 to controller 50.

Figures 2, 3:
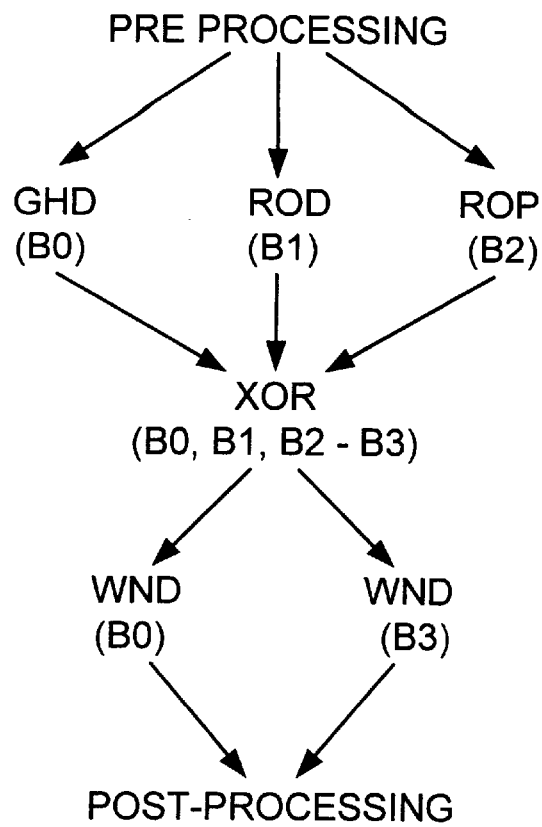
FIG. 2 is a net state diagram for an example net used in the present invention.
FIG. 3 is a diagram of a matrix for the net of FIG. 2 according to the invention.

FIG. 2 illustrates a write net. First, pre-processing is performed. Next, three operations occur in parallel, each using a buffer, designated as buffers B0–B2. These operations are first to get the host data (GHD), read the old data (ROD) and read the old parity (ROP). Next, an exclusive OR function is done to calculate the new parity, with the exclusive OR being performed on the data in buffers B0, B1 and B2, and the result being written to buffer B3.

Next, the new data from buffer B0 is written to the disk, and the new parity, now in buffer B3, is written to the disk. Finally, post-processing steps are performed.

FIG. 3 is a diagram of the matrix configuration of the net of FIG. 2 according to an embodiment of the present invention. The top of the matrix shows the four buffers, B0–B3, which identify the columns of the matrix. The rows of the matrix identify operations performed in parallel in those buffers at different times 100, 102, and 103. At time 100, three of the buffers are used, with buffer B3 being empty. At time 102, the data from buffers B0–B2 continues to stay in those buffers, with their contents being exclusive OR'd to produce a result which is stored in buffer B3. At time 103, the data from buffer B0, which is the new host data, is written to disk, while the data from buffer B3, which is the new parity data, is also written to disk. At time 103, buffers B1 and B2 can be released.

The matrix thus provides an easy way to determine which buffers are used and which are available. Thus, this allows, for example, another operation to use buffer B3 at time 100 or to use buffers B1 and B2 at time 103, thus maximizing the parallel use of the buffers.

Figure 4:
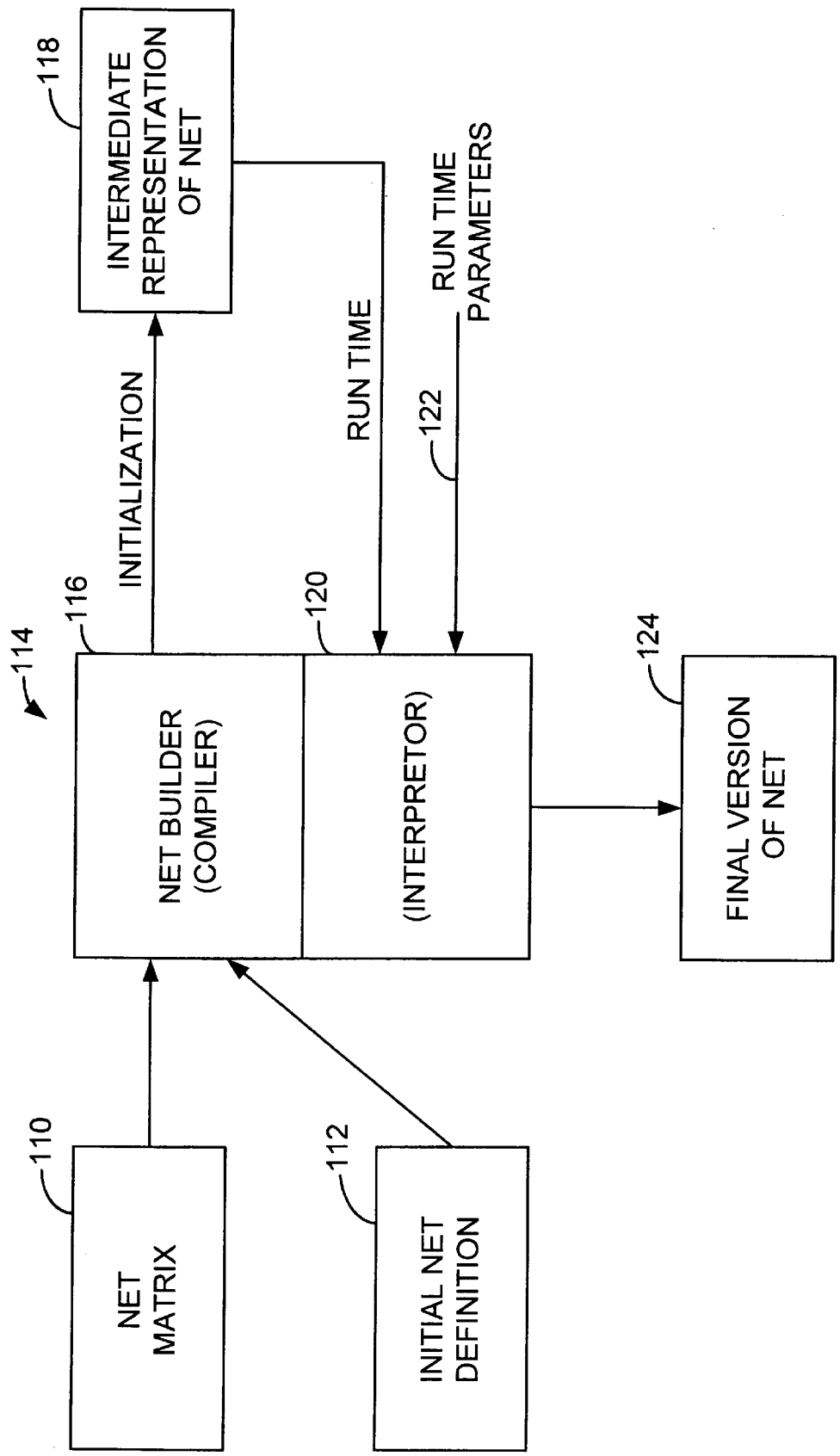
FIG. 4 is a block diagram of an embodiment of the invention illustrating the net builder operation.

FIG. 4 shows a net operator matrix 110 according to an embodiment of the invention. This matrix is code that is generated by a programmer. The matrix in one embodiment is part of the source code for the system and is statically stored as data. The matrices could be represented as simple ASCII text, a HTML format, or a Windows.ini file format.

Also stored in memory are some initial net definitions 112. This includes data about the particular type of net, such as the generic functions for that particular net, its particular recovery table for recovery from errors, the RAID level to which it applies, etc. Using net matrix 110 and the initial net definitions 112, net builder software 114, in a compiler portion 116, constructs a more complicated, intermediate representation of the net 118 upon initialization. The intermediate representation is built and stored in memory 16 or 16'. This representation is a much more complicated set of data structures which would be very difficult for a human to program reliably. They contain all the parameters necessary to build the nets at the time that an I/O command is processed, including the information required to map the buffer usage. They do not, however, contain the actual mapping, because it is often dependent on the actual array configuration.

The intermediate representation allows the nets to be built rapidly. In addition, the intermediate representation allows use of the same data structures to build the same type of net for all the different possible array widths that may be encountered within the RAID level.

At run time, an interpreter portion 120 of the net builder software operates on the intermediate representation 118 and run time parameters provided as shown by an input 122. The run time parameters may include, for example, the actual array width used, the status of particular sectors of the disk drive, such as regeneration status, and the source of the I/O operation (e.g., host or internal). The interpreter then outputs a final version of the net 124 which is used to run the I/O operation specified.

The use of the matrix in the present invention allows the net to be written according to a set of rules. New nets can be written without much concern about buffer usage, other than issues of common usage and inputs to certain operators. The physical buffer assignments are dealt with automatically when the net is built.

The net operator matrices 110 are, in one embodiment, specific to a RAID level. This is an implementation choice and is not a requirement of the net builder. A net definition 112 specifies a matrix, plus other information to (possibly) customize the net behavior, plus the exact combination of RAID level, I/O command source, command Opcode, and array access type that selects the net. Thus the matrix to net definition mapping is one-to-many.

Figure 5:
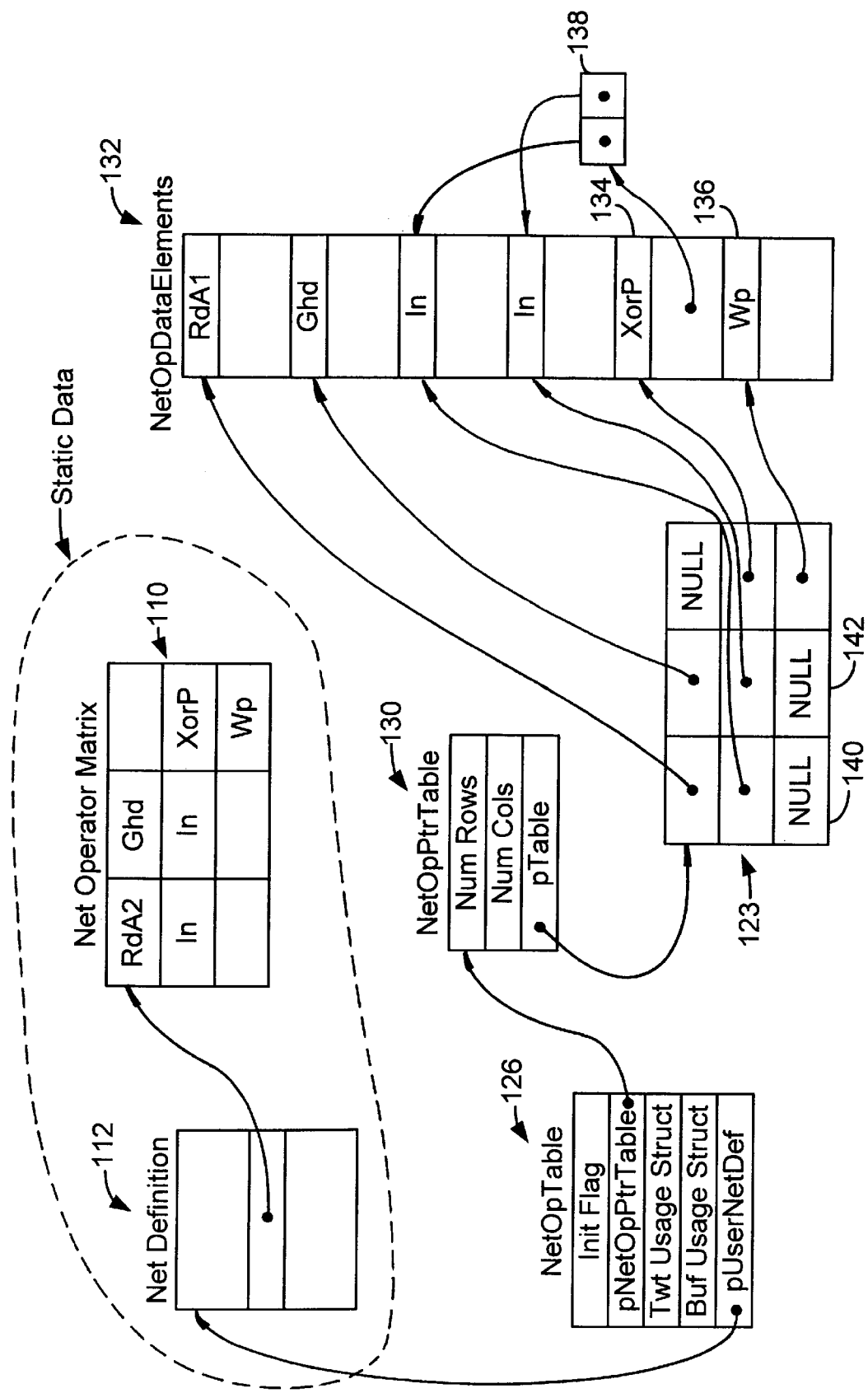
FIG. 5 is a diagram of an embodiment of the invention illustrating the use of pointers in the matrix and other data structures of the invention.

FIG. 5 illustrates the use of pointers in the data structures of the present invention. Net operator matrix 110 is static data which is, in one implementation, compiled into the RAID controller software program. Net definition table 112 is also static, programmed data in this implementation. There is one net definition table 112 for each net type that the system supports.

The net builder software compiler portion 116 audits each net definition table and net operator matrix for correctness and adherence to the net definition rules. It then creates, for each valid net definition table, a NetOpTable 126, a NetOpPtrTable 130, a NetOpDataElement pointer matrix 123, and a set of NetOpDataElements 132, with any required input pointer arrays 138. The NetOpTable 126 is also initialized to point back to the net definition table 112. These data structures 126, 130, 123, 132, 138, and 112 embody the intermediate representation of the net definition.

As can be seen, the elements of matrix 123 are either null pointers, corresponding to unused cells in the net operator matrix, or pointers to initialized net operator data elements 132. One of the data elements pointed to is an exclusive OR operation 134, which contains a pointer 136 to a data structure which identifies the input buffers to be deallocated by the thread which implements the exclusive OR, after the operation is completed.

Each net operator data element is initialized to contain a pointer to a table which, in turn, contains pointers to the set of generic functions that are used to process that particular net operator type. The net operator data elements also contain enough information to tailor the operation of the generic functions for the context in which the data element is processed. This mechanism allows one set of net operators to be used for all RAID levels, and also allows one net definition table, which uses a single operator matrix definition, to be used for any storage array width within a specific RAID level.

Each net definition specifies a RAID level that it applies to, and the intermediate representations include the net definition data structure, via the pointer back from the NetOpTable (126 points back to 112). The inclusion of the net definitions in the intermediate representation allows access to the net styles, and modifier words and a "tweak function" pointer.

The user specifies, for each net definition, a unique combination of four values:

| | |
|---|---|
| Composition | (RAID level) |
| Source | (The I/O source - basically external or internal) |
| Opcode | (The I/O operation type. Write, Read, etc.) |
| Access | (The type of array access for this particular operation. Normal, regen, etc.) |

We refer to this unique combination as the CSOA for the net. There is a 4-dimensional table, which contains an entry for each possible CSOA value. After the compiler portion of the net builder runs, each cell in the table contains either a pointer to a data structure, or a NULL value. If NULL, no net is defined for that CSOA. If there is a pointer value, then it points to a small data structure which contains, among other things, a pointer to the intermediate representation of the net definition. This is the only way to retrieve a pointer to the intermediate representation.

The RAID level is known, because it is one part of CSOA, and CSOA is used to retrieve the net definition intermediate representation. But the interpreter portion of the net builder does not make any decisions based on the RAID level.

The interpreter does not care at all about CSOA past the point where it retrieves the intermediate representation. Anything that is RAID-level specific in the intermediate representation, in the sense that there is a knowledge of mirrored data sets, for example, is built into the Net Operators themselves. All the interpreter needs to do is access each Net Operator Data Element, follow the pointer to the function table, and call the data initialization function for each operator.

It is possible to have two unique, yet identical, intermediate representations, each of which applies to a different RAID level. These two net definitions would generate identical intermediate representations, with the exception of the pointer back to the user net definition and the user net definition itself (because each would specify a different CSOA), but they would be independent, and would be accessed via two different CSOA values.

Set forth below is example software source code which defines three different nets that are used to perform RAID-5 I/O. The first section defines the three net operator matrices 110.

The next section (beginning with "Start VSM net error recovery table definitions") defines the error recovery tables that are available for use.

The third section (beginning with "Start net definitions") contains the three net definitions 112. Note that each net definition is specific to a RAID level, an I/O source, an operation type, and the array access state. Each net definition specifies one net operator matrix and one error recovery table. A single net operator matrix can be used by multiple net definitions. A single error recovery table can be used by multiple net definitions, as shown. The net definition style settings are used to modify the default net behavior.

```
/*----------------------------------------------------------------------------- */
/* Start Raid 5 Net Operator Matrix definitions                                 */
/* Host read when the data member is available.                                 */
static NetOpMatrixT NetMatRaid5HostRead =
{
    NetOpRhdn1,        NetOpEndRow
};
/* Host read when the data member to read is missing.                           */
static NetOpMatrixT NetMatRaid5HostRegenRead =
{
    NetOpRdA1,  NetOpRp,    NetOpNop,   NetOpEndRow,
    NetOpIn,    NetOpIn,    NetOpXorR,  NetOpEndRow,
    NetOpNop,   NetOpNop,   NetOpShd,   NetOpEndRow
};
/* Host write when the data member is available.                                */
static NetOpMatrixT NetMatRaid5HostWrite =
{
    NetOpGhd,   NetOpRod,   NetOpRp,    NetOpNop,   NetOpEndRow,
    NetOpIn,    NetOpIn,    NetOpIn,    NetOpXorP,  NetOpEndRow,
    NetOpWnd,   NetOpNop,   NetOpNop,   NetOpWp,    NetOpEndRow,
};
/*----------------------------------------------------------------------------- */
/* Start VSM Net error recovery table definitions                               */
/* These tables may be used by more than one net definition.                    */
/* These are used to decide what should be done when a specific Twt type        */
/* within a specific Net type gets an error. It is assumed that the error       */
/* is caused by some type of drive failure between the time that the net        */
/* was built and the Twt is ready to execute.                                   */
/*                                                                              */
/* Each NetDefT (net definition) structure below can specify a maximum of       */
/* one table address.                                                           */
/*                                                                              */
/*----------------------------------------------------------------------------- */
static VsmNetRecoveryTableT Raid5GenericReadWriteRecoveryTable =
{
    {twtRead,            TwtOpModNone,    gStatusNewOperation,  vsmRead},
    {twtRead,            TwtOpModRhd,     gStatusNewOperation,  vsmRead},
    {twtRead,            TwtOpModParity,  gStatusNewOperation,  vsmReadParity},
    {twtReadn1,          TwtOpModNone,    gStatusNewOperation,  vsmRead},
    {twtReadHostDatan1,  TwtOpModRhd,     gStatusNewOperation,  vsmRead},
    {twtWrite,           TwtOpModNone,    gStatusComplete,      vsmMaxIOOperation},
    {twtWrite,           TwtOpModParity,  gStatusComplete,      vsmMaxIOOperation},
};
static VsmNetRecoveryTableT Rad5RegenReadWriteRecoveryTable =
{
    {twtRead,            TwtOpModNone,    gStatusFailure,       vsmMaxIOOperation},
    {twtRead,            TwtOpModRhd,     gStatusFailure,       vsmMaxIOOperation},
    {twtWrite,           TwtOpModNone,    gStatusFailure,       vsmMaxIOOperation},
};
```

```
/*---------------------------------------------------------------------------*/
/* Start Net definitions                                                     */
/* Data read, all members available.                                         */
NetDefT NetDefRaid5HostDataRead =
{
    RAID5_HOST_IO_NET (vsmRead, netNormalAccess),
    NET_NO_OP_CODE_MODIFIER,
    NET_NO_PARTITION_MODIFIER,
    NET_STYLE_DEFAULT | NetStyleSingleTwtNet | NetStyleNoSpanLock | NetStyleNetVerified,
    NET_NO_POST_INIT_TWEAK_FUNCTION,
    NET_RECOVERY_TABLE_SPECIFICATION(Raid5GeneralReadWriteRecoveryTable),
    NET_OP_MAT_SPECIFICATION (NetMatRaid5HostRead)
};
/* Data Read, data member is missing.                                        */
NetDefT NetDefRaid5HostDataReadDataRegen =
{
    RAID5_HOST_IO_NET (vsmRead, netDataRegenAccess),
    NET_NO_OP_CODE_MODIFIER,
    NET_NO_PARTITION_MODIFIER,
    NET_STYLE_DEFAULT | NetStyleNetVerified,
    NET_NO_POST_INIT_TWEAK_FUNCTION,
    NET_RECOVERY_TABLE_SPECIFICATION(Raid5RegenReadWriteRecoveryTable),
    NET_OP_MAT_SPECIFICATION (NetMatRaid5HostRegenRead)
};
/* Data write when the data member is available.                             */
NetDefT NetDefRaid5HostWrite =
{
    RAID5_HOST_IO_NET (vsmWrite, netNormalAccess),
    NET_NO_OP_CODE_MODIFIER,
    NET_NO_PARTITION_MODIFIER,
    NET_STYLE_DEFAULT | NetStyleNetVerified,
    NET_NO_POST_INIT_TWEAK_FUNCTION,
    NET_RECOVERY_TABLE_SPECIFICATION(Rad5GenericReadWriteRecoveryTable),
    NET_OP_MAT_SPECIFICATION (NetMatRaid5HostWrite)
};
```

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A method for operating an I/O controller, comprising:
    creating a plurality of threads, each thread performing a specified subset of an I/O operation;
    creating a plurality of nets, each net being a group of threads, each net being represented as a net matrix corresponding to buffer locations and threads;
    compiling an intermediate representation of said net matrix upon initialization of said I/O controller; and
    interpreting said intermediate representation to assemble a complete version of a net upon processing an I/O command.

2. The method of claim 1 wherein said I/O controller is a RAID controller and said intermediate representation includes net operators that correspond to a particular RAID level.

3. The method of claim 2 wherein said interpreting is performed by software which is independent of RAID level.

4. The method of claim 1 wherein said I/O controller is a RAID controller and said complete version includes an array width which is not included in said intermediate representation.

5. The method of claim 1 wherein said I/O controller is a RAID controller and said complete version includes a memory allocation based on a status of memory locations which is not included in said intermediate representation.

6. The method of claim 1 wherein said complete version includes an identification of the source of the I/O operation which is not included in said intermediate representation.

7. The method of claim 1 wherein said net matrix comprises an array of pointers to initialized net operator data elements and null pointers.

8. A method for operating a RAID I/O controller, comprising:
    creating a plurality of threads, each thread performing a specified subset of an I/O operation;
    creating a plurality of nets, each net being a group of threads, each net being represented as a net matrix corresponding to buffer locations and threads, said net matrix including a plurality of pointers to initialized net operator data elements and null pointers;
    compiling an intermediate representation of said net matrix upon initialization of said I/O controller, said intermediate representation including net operators that correspond to a particular RAID level; and
    interpreting said intermediate representation using software which is independent of RAID level to assemble a complete version of said a net upon processing an I/O command, said complete version adding to said intermediate representation an array width, a memory allocation based on a status of memory locations and an identification of the source of the I/O operation.

9. An I/O controller, comprising:
    a memory storing a plurality of threads, each thread performing a specified subset of an I/O operation;
    said memory including pointers to said threads creating a plurality of nets, each net being a group of threads, each net being represented as a net matrix corresponding to buffer locations and threads;

means for compiling an intermediate representation of said net matrix upon initialization of said I/O controller; and means for interpreting said intermediate representation to assemble a complete version of a net.

10. An I/O controller, comprising:

a controller, a memory coupled to said controller, said memory storing a plurality of threads, each thread performing a specified subset of an I/O operation;

said memory including a net builder program having instructions for compiling an intermediate representation of a net matrix upon initialization of said I/O controller, said net matrix describing a net composed of a group of threads, and corresponding to buffer locations and said threads; and said net builder program including instructions for interpreting said intermediate representation to assemble a complete version of said net matrix upon processing an I/O command.

* * * * *